United States Patent
Kline et al.

(10) Patent No.: US 7,369,739 B2
(45) Date of Patent: May 6, 2008

(54) FIBER OPTIC CABLE PROTECTIVE APPARATUS

(75) Inventors: James R. Kline, Petoskey, MI (US); Thomas J. Kline, Petoskey, MI (US); Dustin S. Sene, Emigrant, MT (US)

(73) Assignee: Fiber Optic Protection Systems, Inc., Tampa, FL (US)

( * ) Notice: Subject to any disclaimer, the term of this patent is extended or adjusted under 35 U.S.C. 154(b) by 154 days.

(21) Appl. No.: 11/198,959

(22) Filed: Aug. 8, 2005

(65) Prior Publication Data

US 2007/0031101 A1 Feb. 8, 2007

(51) Int. Cl.
*G02B 6/00* (2006.01)
(52) U.S. Cl. ................. 385/135; 385/139; 385/137
(58) Field of Classification Search ......... 385/134–139
See application file for complete search history.

(56) References Cited

U.S. PATENT DOCUMENTS

| | | | |
|---|---|---|---|
| 6,495,756 B1* | 12/2002 | Burke et al. | 174/70 R |
| 6,616,080 B1* | 9/2003 | Edwards et al. | 242/378.1 |
| 6,803,525 B1* | 10/2004 | Liao | 174/135 |
| 7,120,349 B2* | 10/2006 | Elliott | 385/137 |
| 2004/0200919 A1* | 10/2004 | Burke et al. | 242/378.1 |
| 2005/0226588 A1* | 10/2005 | Pons | 385/135 |
| 2006/0006038 A1* | 1/2006 | Beverlin | 191/12.2 R |
| 2006/0186255 A1* | 8/2006 | Rooker | 242/395 |

OTHER PUBLICATIONS

Mad Catz, Inc. Oct. 22, 2004, Image.*
Mad Catz, Inc. Dec. 2, 2004, Image.*

* cited by examiner

*Primary Examiner*—Eric Wong
(74) *Attorney, Agent, or Firm*—John K. McCulloch

(57) ABSTRACT

A rigid casing provides support and protection for two separate fiber optic jumper cables of a fiber optic test set and which may be wound on two separate spools for extension and retraction relative to the casing. A selected length of one of the cables may be extended from the casing and connected to a part of a fiber optic circuit to be tested, following which a selected length of the other cable may be extended from the casing and connected to another part of the circuit. The spools are capable of rotation about a common axis with and relative to one another. The cables have confronting ends at the axis of rotation of the spools and in axial alignment so that light energy emitted from either cable may be received by the other without interruption.

25 Claims, 7 Drawing Sheets

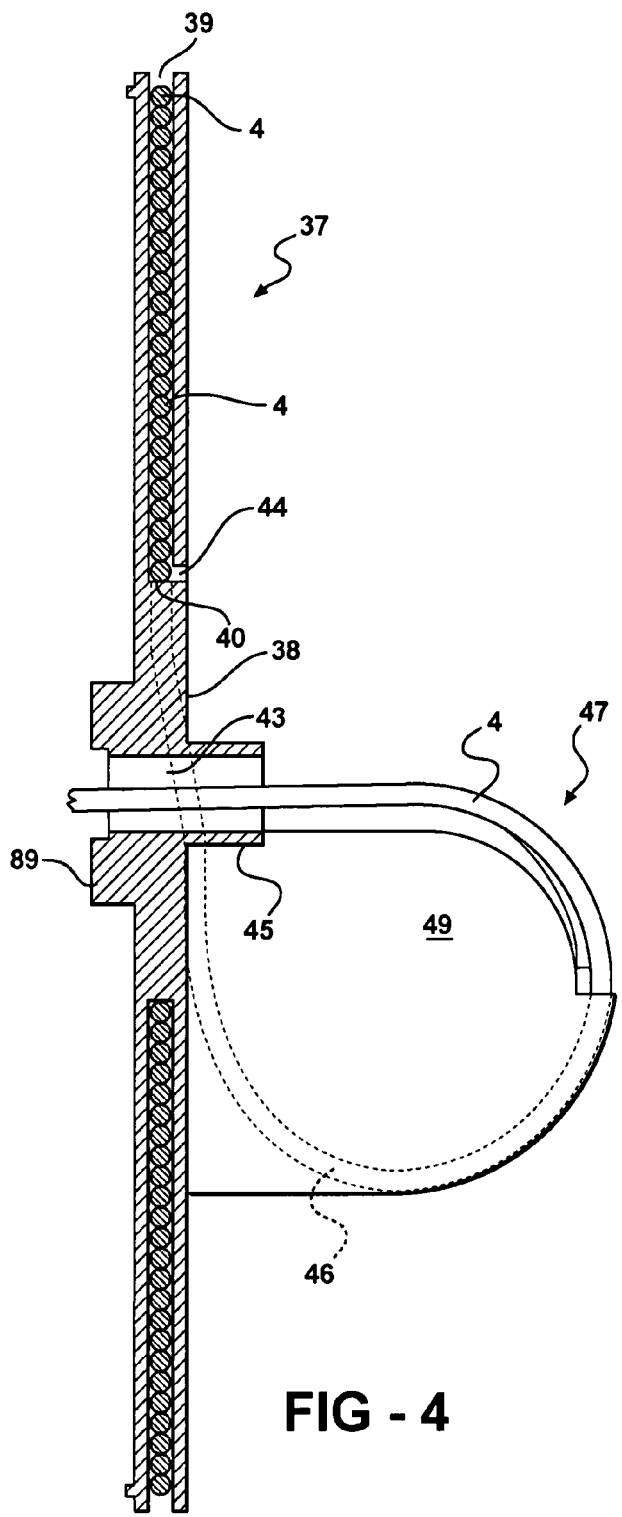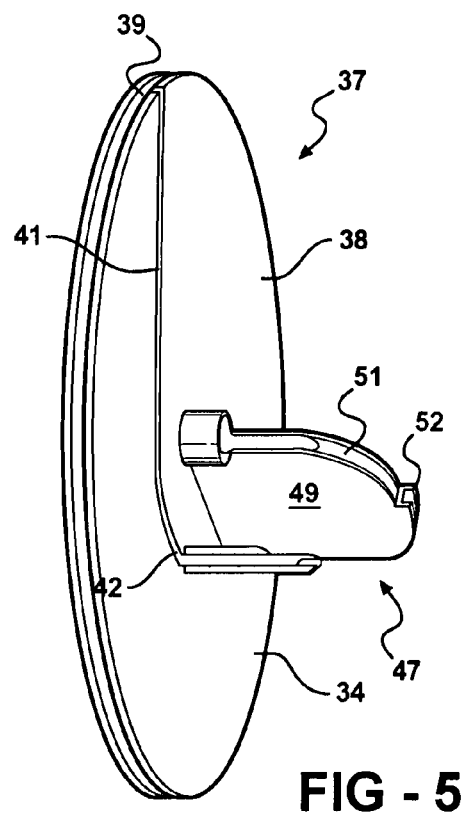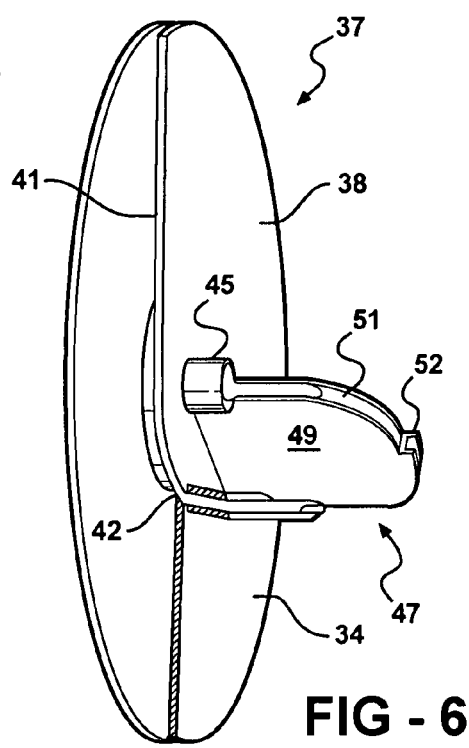
FIG - 4
FIG - 5
FIG - 6

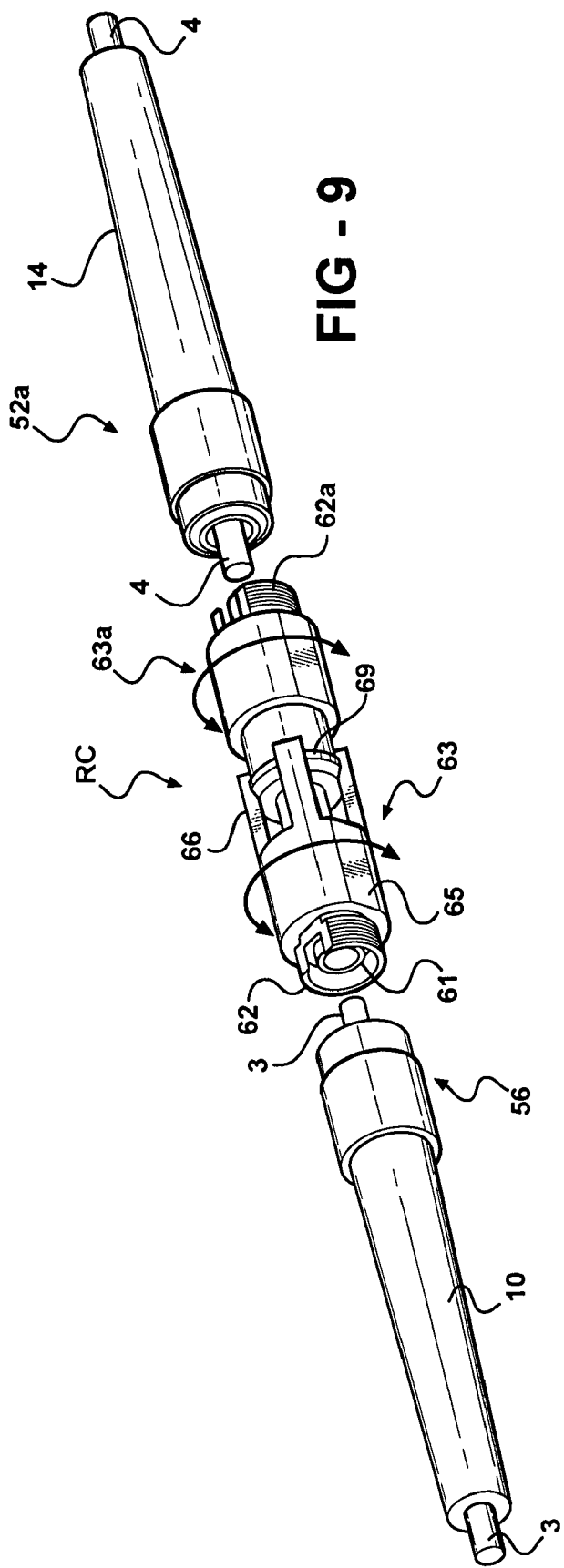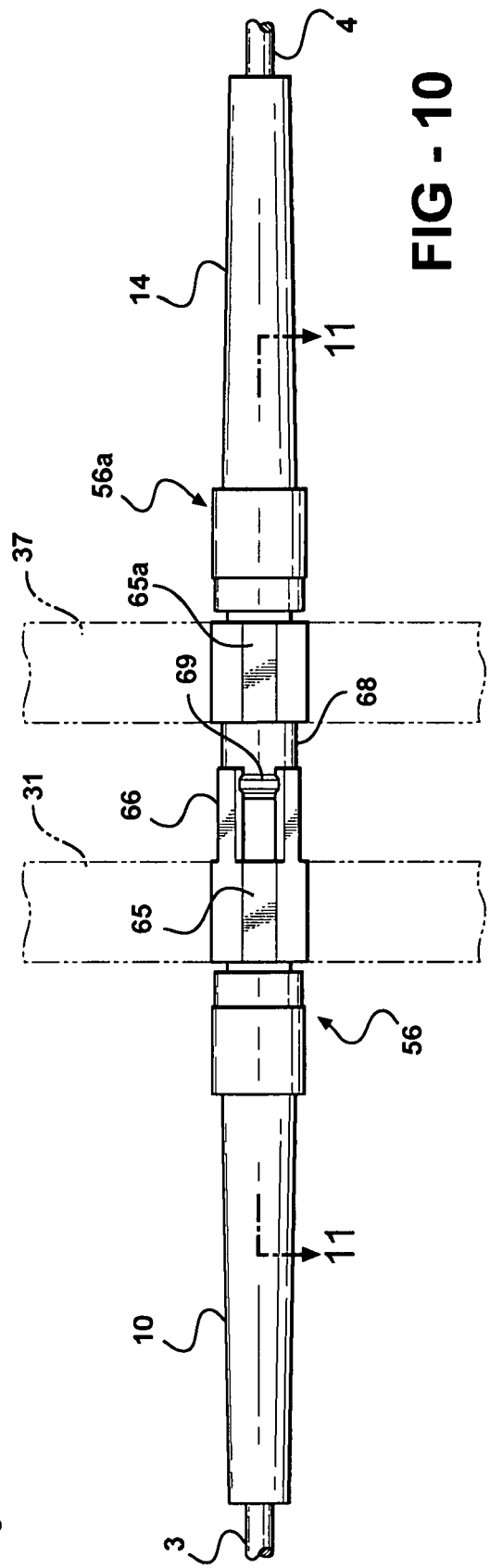

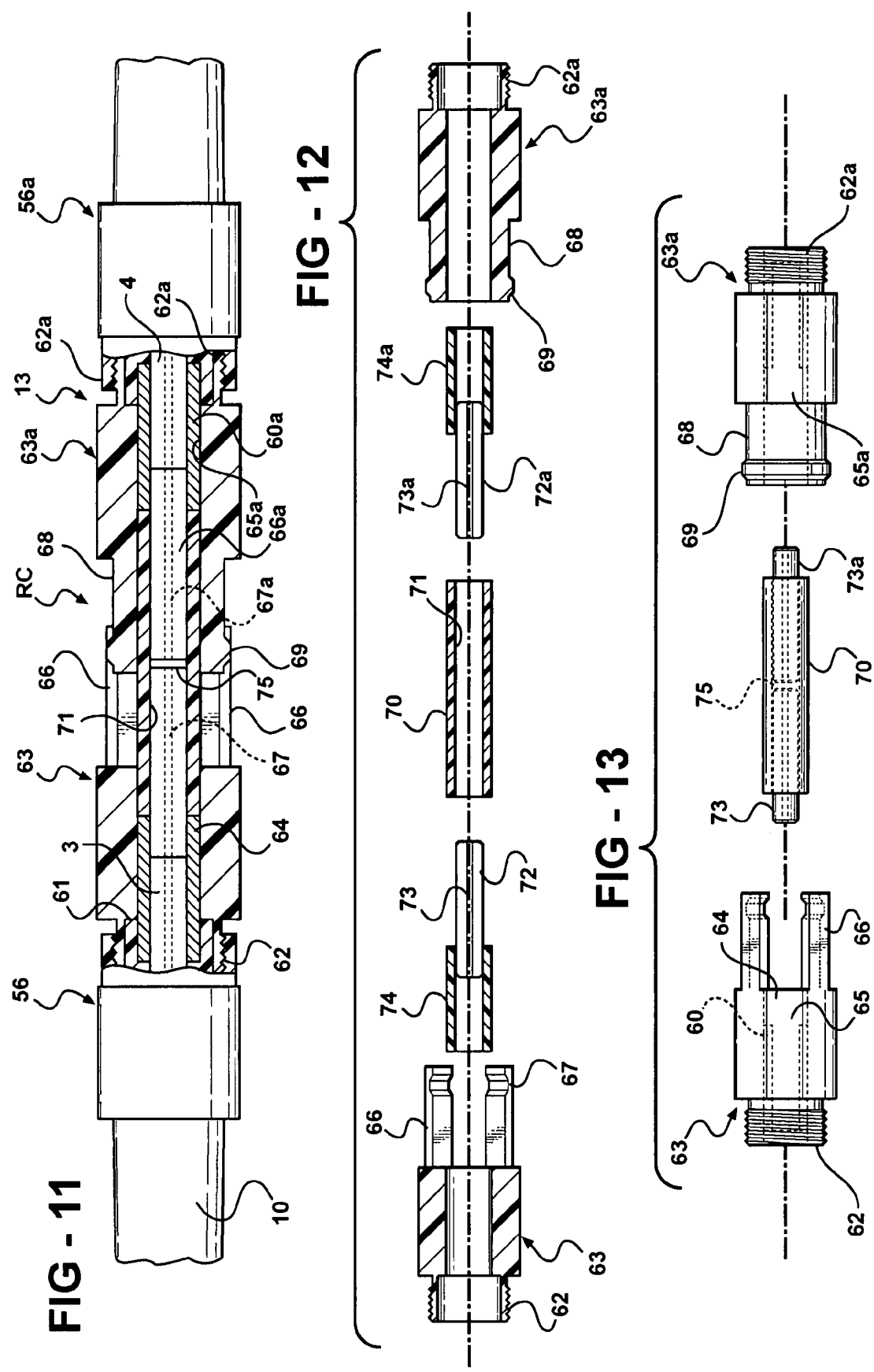

FIBER OPTIC CABLE PROTECTIVE APPARATUS

This invention relates to apparatus for storing coil able materials, such as a pair of separate fiber optic cables, wound about separate spools in a protective housing, the spools being rotatable through 360° independently of one another for extension and retraction of the respective cables from and into the casing in a consistent and controlled manner.

BACKGROUND OF THE INVENTION

When installing, testing, maintaining, or tuning all ranges of fiber optic networks it is necessary to make use of various test sets. A test set ordinarily will include one or more fiber optic jumper cables for verifying the integrity of the signal flow through various parts of a fiber optic circuit. A typical fiber optic jumper cable consist of two standard connectors, connected to a given length of a single simplex cable which is a standard cable manufactured by Dow Corning Corporation. For this application we are using a typical cable consisting of a glass fiber, surrounded by a teflon buffer encased in aramid yarn or kevlar fibers with a PVC outer jacket. The dimensions of the component parts are: glass fiber is 126 μm, teflon buffer is 900 μm, aramid yarn is 1.6 mm, ABS outer jacket is 0.4 mm, and the outside diameter is 2.9 mm. The length of the fiber optic jumper cable depends on the distance that must be spanned by such cable. A fiber optic jumper cable, or simply cable, as that term is used herein, means a light transmitting glass core or fiber encased in a sheath of flexible cladding material which precludes extraneous light collection or loss transversely of the fiber.

A fiber optic jumper cable as currently used for testing purposes in the field normally is accommodated for storage and shipment in a transparent, flimsy, plastic bag. Conventionally, such a cable is wound about a radius of two inches or more to form a coil which is placed in the plastic bag without any additional protection against damage from externally applied forces, such as that resulting from being stepped on or struck by falling objects. The storage of a fiber optic cable in such a bag is undesirable because of the inability to maintain consistent control over minimum bending radii and the susceptibility to damage of such cable while accommodated in such bag.

A fiber optic jumper cable has certain known physical and optical characteristics, such as the fiber, the connector size, and shape, and signal transmissivity attenuating properties of the fiber. These characteristics must be protected carefully during use of a jumper cable. The attenuating properties usually are determined prior to the time the cable is coiled, whereas the coiled diameter of the cable determines the minimum radius about which the cable may be bent or wound to ensure against damaging the glass fiber. These characteristics may be embraced by the term "minimum bending radius" which, as used herein, means the minimum radius about which the cable may be bent without subjecting the fiber to physical damage or any appreciable loss of signal transmissivity.

When a field engineer extracts a coiled fiber optic jumper cable from the plastic bag in which it is stored, it is common practice for the engineer to discard the bag and manually uncoil and recoil the cable prior to and following its use. Manual uncoiling of the cable frequently results in slack lengths of cable and the formation of unnecessary extra coils that may cause the cable to become twisted or kinked, whereas inconsistent control over manual recoiling of the cable subjects it to the possibility that it will be wound about a radius less than the minimum bending radius, thereby physically damaging the fiber and adversely affecting its ability to transmit an optical signal without undue attenuation.

In those instances in which the test set and a fiber optic jumper cable are shipped or stored in the same container, the fiber is exposed to the possibility of being damaged by the test equipment itself during transit.

The distance from the test set to the equipment under test varies in different testing environments. The current practice, therefore, requires the selection of a length of cable which almost always is greater than the distance to be spanned, thereby resulting in excessive sagging and the formation of unnecessary extra coils distributed between the ends of the cable. After use the recoiling of the cable by hand results in uncertain bending radii and increases the risk of damaging the fiber.

The distance from the test set to one part of a circuit to be tested may be, and usually is, different than the distance from the test set to another part of the circuit. One solution to the sagging problem encountered when using a single cable is the use of apparatus disclosed in application Ser. No. 11/081,190 filed Mar. 16, 2005. Such apparatus includes a single cable and two spools about which the single cable is wound. As a consequence the cable must be unwound from and rewound on the two spools in a predetermined order which may not always be convenient.

A principal object of this invention is to provide apparatus which overcomes the objectionable characteristics referred to above.

SUMMARY OF THE INVENTION

Apparatus constructed in accordance with the invention comprises a casing formed of a rigid plastic material defining a protective hollow housing within which two separate spools are journaled for rotation conjointly or independently of one another. Around one spool is wound a selected length of a first fiber optic cable for controlled cable length extension from and retraction into the housing. A selected length of a second cable is wound about the second spool for controlled cable length extension from and retraction into the housing. The inner ends of the two cables confront one another and are supported in a 360° rotatable coupler on which the two spools are mounted for independent rotation through 360° in a selected one of two opposite directions. The inner ends of the two cables are maintained in axial alignment so that light energy may pass from one cable to the other without interruption or appreciable loss.

The two spools are mounted for rotation about a common axis and in such manner that either spool and its associated cable may be rotated through 360° relative to or conjointly with the other. One spool is rotatable about the axis of rotation by means of a handle or crank and the rotation of such spool may be transmitted to the other or second spool via a clutch and a gear transmission. Either spool may be rotated in one direction simply by withdrawing the desired length of the associated cable from the housing. Again, the rotation of one spool may be transmitted via the transmission to the other.

The radius about which each cable is coiled is no less than the minimum bending radius of the cable, and no part of the cable is subjected to bending or turning about a radius less than the minimum bending radius.

Each spool has an annular groove in which a selected length of cable is wound. Each groove communicates with a guide forming a path from the groove to the axis of rotation of the spools. The path formed by the guide avoids kinking, twisting, or otherwise damaging the fiber.

Each cable has an outer end that may be extended from its associated spool. At the outer end of each cable is secured a fitting or connector. One connector occupies a protective receiver formed by a bell-shaped opening in the casing. The receiver enables a desired length of cable to be unwound from its associated spool and extended from the casing a substantial distance. The connector at the outer end of the second cable removably may be secured at one side of the spool by a retainer. The length of cable that extends from the axis of rotation of the second spool to the second connector may be the same as, greater, or less than that of the other cable.

THE DRAWINGS

The presently preferred embodiment of the apparatus is illustrated in the accompanying drawings wherein:

FIG. 1 is an enlarged, diagrammatic, isometric view, omitting the casing, of two fiber optic cables wound in such manner as to provide two coiled cables of different lengths;

FIG. 1a is a cross-sectional, greatly enlarged view of a typical fiber optic cable having an outer jacket, aramid yarn, tight buffer, and a glass fiber core. The buffer protects the fiber, the kevlar fibers offer strength, and prevent excessive stretch and temperature control. The outer jacket is an abs plastic coating which offers abrasion resistance.

FIG. 4 is a diagrammatic view illustrating one spool and how the cable wound thereon is guided to the axis of rotation of the spool;

FIG. 5 is an isometric, reduced scale view illustrating the spool of FIG. 4 and the associated guide;

FIG. 6 is a partly sectional view similar to FIG. 5;

FIG. 9 is an isometric view of a 360° rotatable coupler for optically coupling confronting ends of two separate fiber optic cables; via the associated standard F C male connectors.

FIG. 10 is an elevational view of the 360° rotatable coupler, connected to a pair of standard F C male connectors of the kind commonly used in a jumper cable test set and indicating diagrammatically a pair of spools mounted for rotation;

FIG. 11 is a fragmentary, partly sectional and partly elevational view on an enlarged scale of the 360° rotatable coupler, including standard F C female connector ends, connected to standard F C male to F C male connectors; and FIGS. 12 and 13 are exploded views of the 360° rotatable coupler in different stages of assembly.

THE PREFERRED EMBODIMENT

Figure 1:
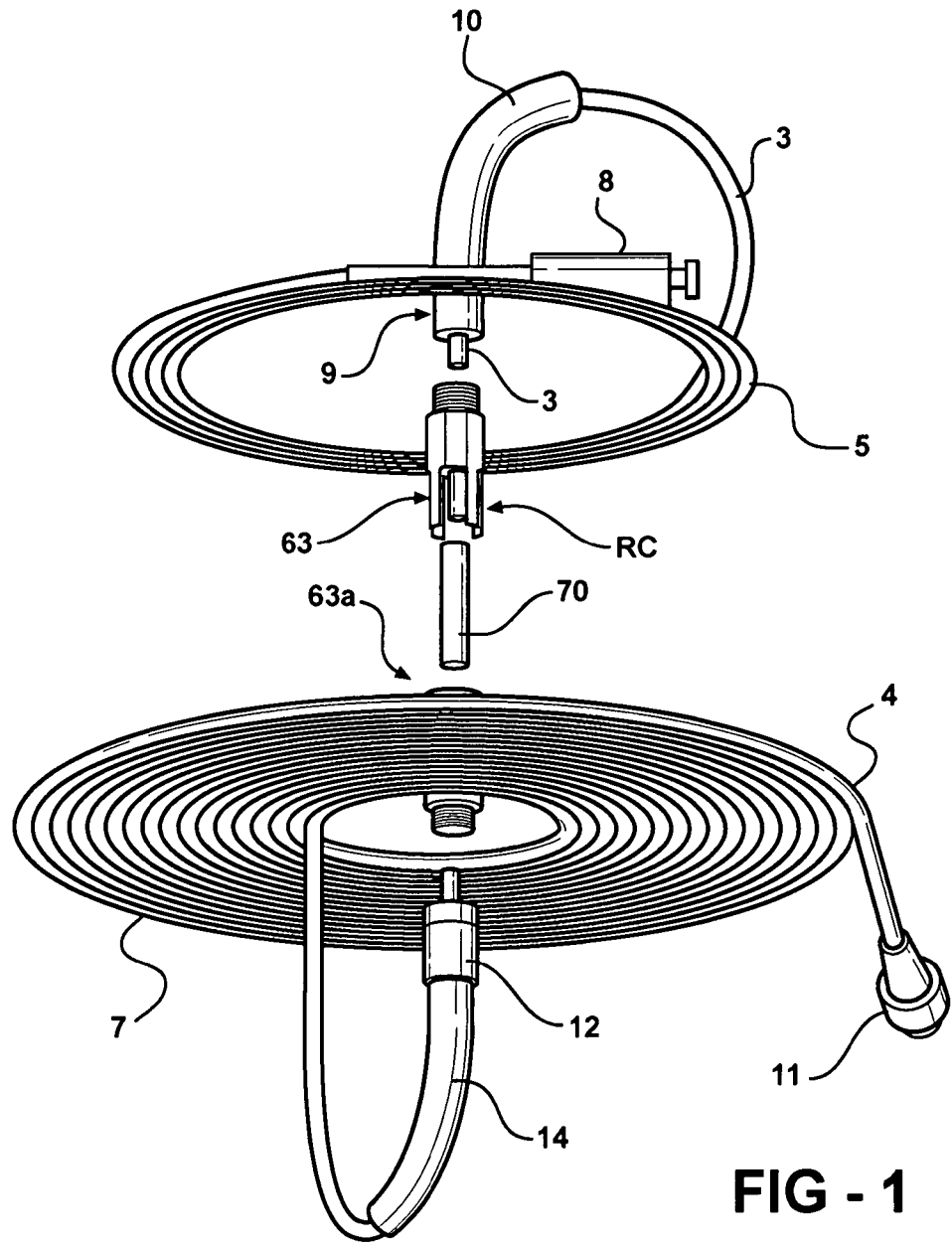
Figure 2:
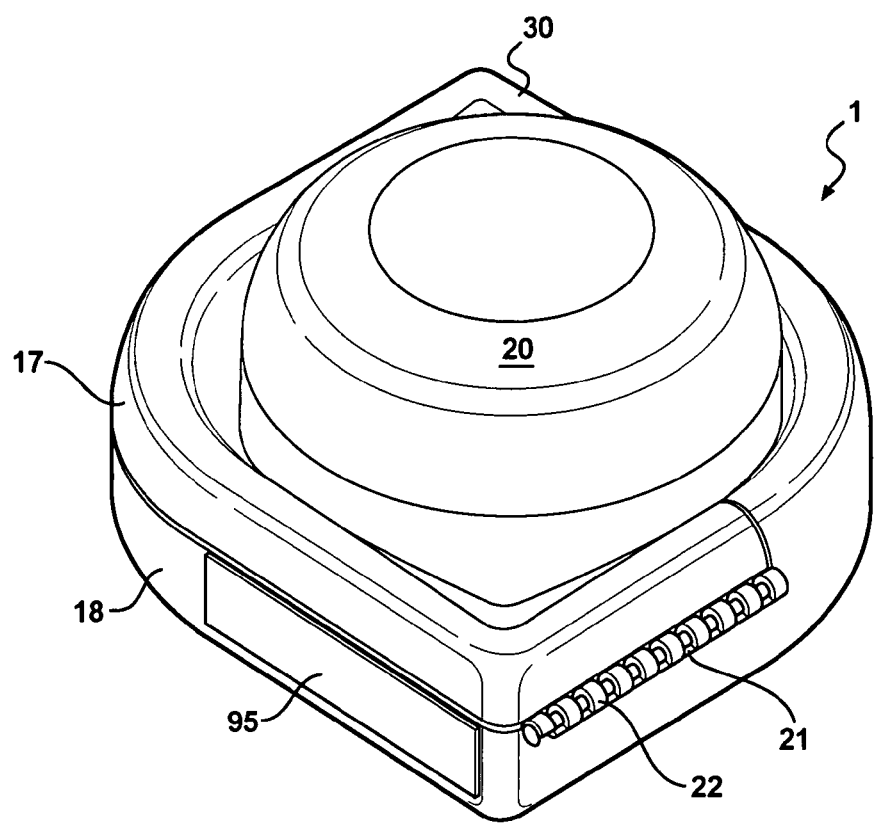
FIG. 2 is an isometric view of a casing in which the coiled cables may be stored, the casing being closed.
Figure 3:
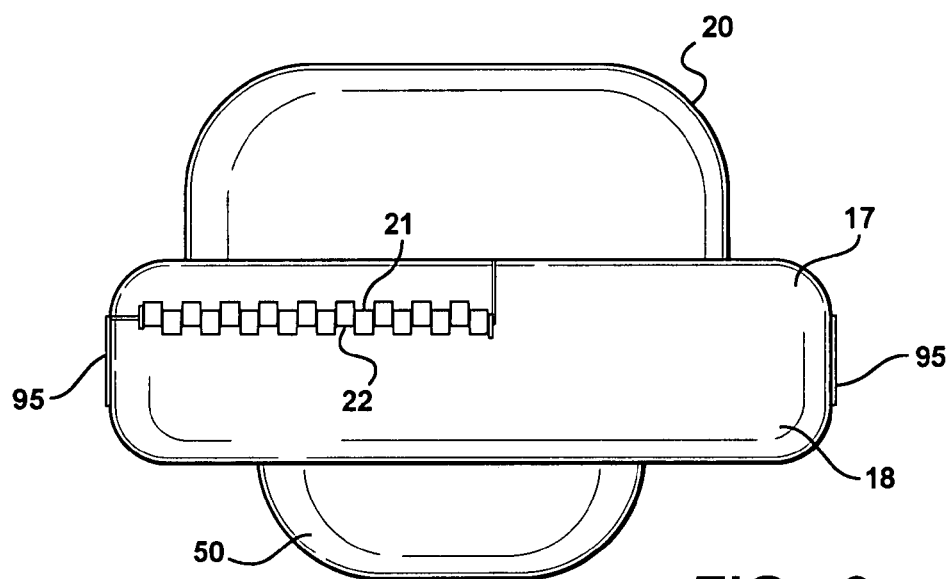
FIG. 3 is a side elevational view of the closed casing.

Apparatus constructed in accordance with the preferred embodiment of the invention comprises a casing 1 (FIGS. 2 and 3) formed from rigid plastic material, such as polycarbonate or that used in the manufacture of so-called jewel cases for compact discs and the like. The casing is adapted to contain, protect, and enable control to be exerted over two separate and independent lengths of coil able material, such as two conventional, fiber optic cables 3 and 4. As shown in FIG. 1 the cable 3 is a single simplex cable forming a first coil 5 and the cable 4 is a single simplex cable forming a second coil 7. The radius of each coil is at least as great as the minimum bending radius of the respective cables.

Figure 1A:
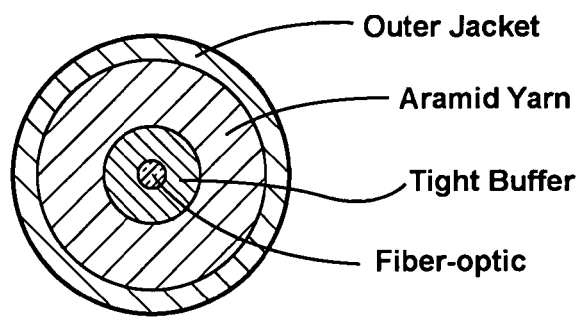

Each cable has, as is conventional, an axially and longitudinally extending glass core commonly referred to as a fiber which is capable of transmitting light energy the full length of the cable, the fiber being encircled by a tight buffer, aramid yarn, and an outer jacket for protection. See FIG. 1a. In the disclosed embodiment the cable 3 has a length less than that of the cable 4, but the length of the respective cables may be the same or different, as desired. The cable 3 has at one end a conventional connector 8 and terminates at its opposite end in a conventional F C male type connector 9 including a flexible, strain relieving boot 10. At one free end of the cable 4 is fixed a conventional fitting or connector 11 and at the opposite free end of the cable section 4 is fixed a standard F C male connector 12 including a flexible, strain relieving boot 14. The standard FC male connectors 9 and 12 are connected to a 360° rotatable coupler RC disclosed more fully hereinafter.

Figure 7:
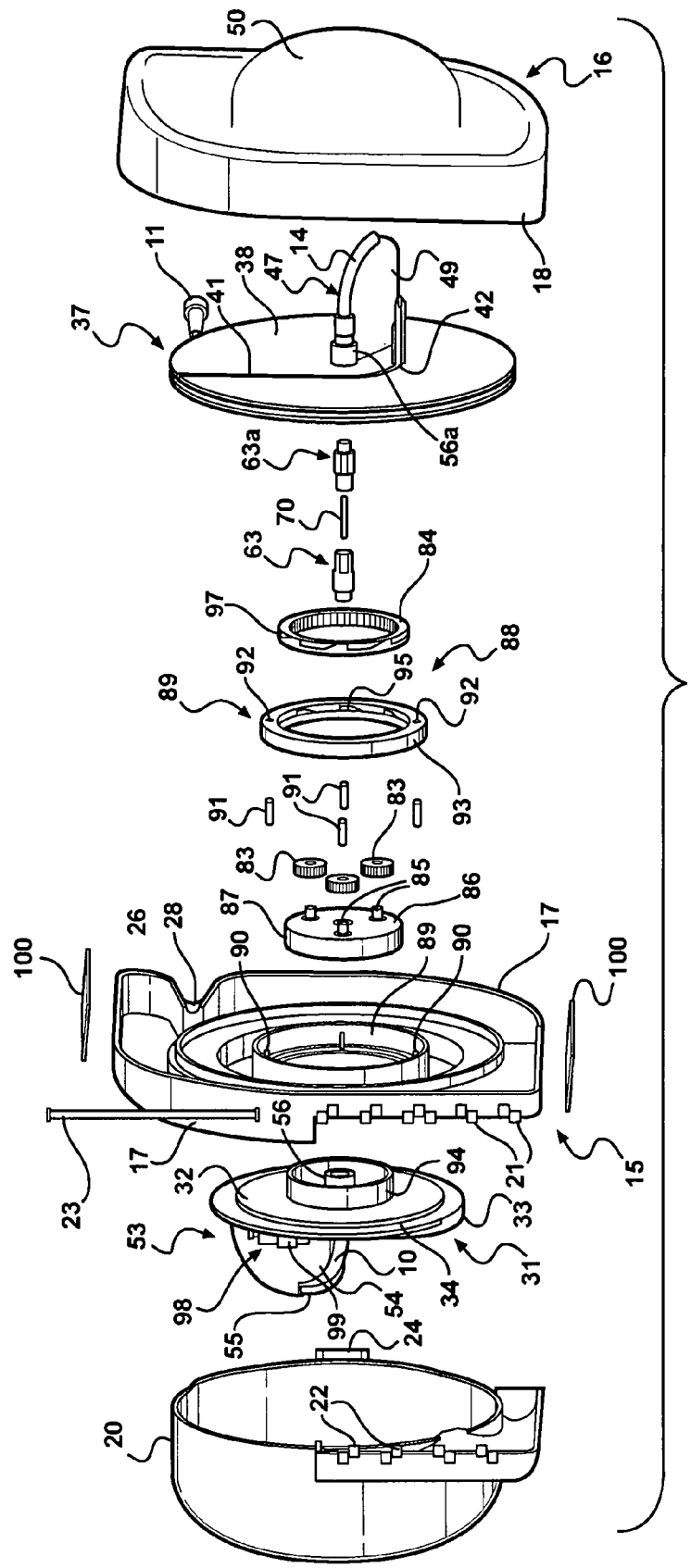
FIG. 7 is an isometric, exploded view of the apparatus as viewed in one direction.
Figure 8:
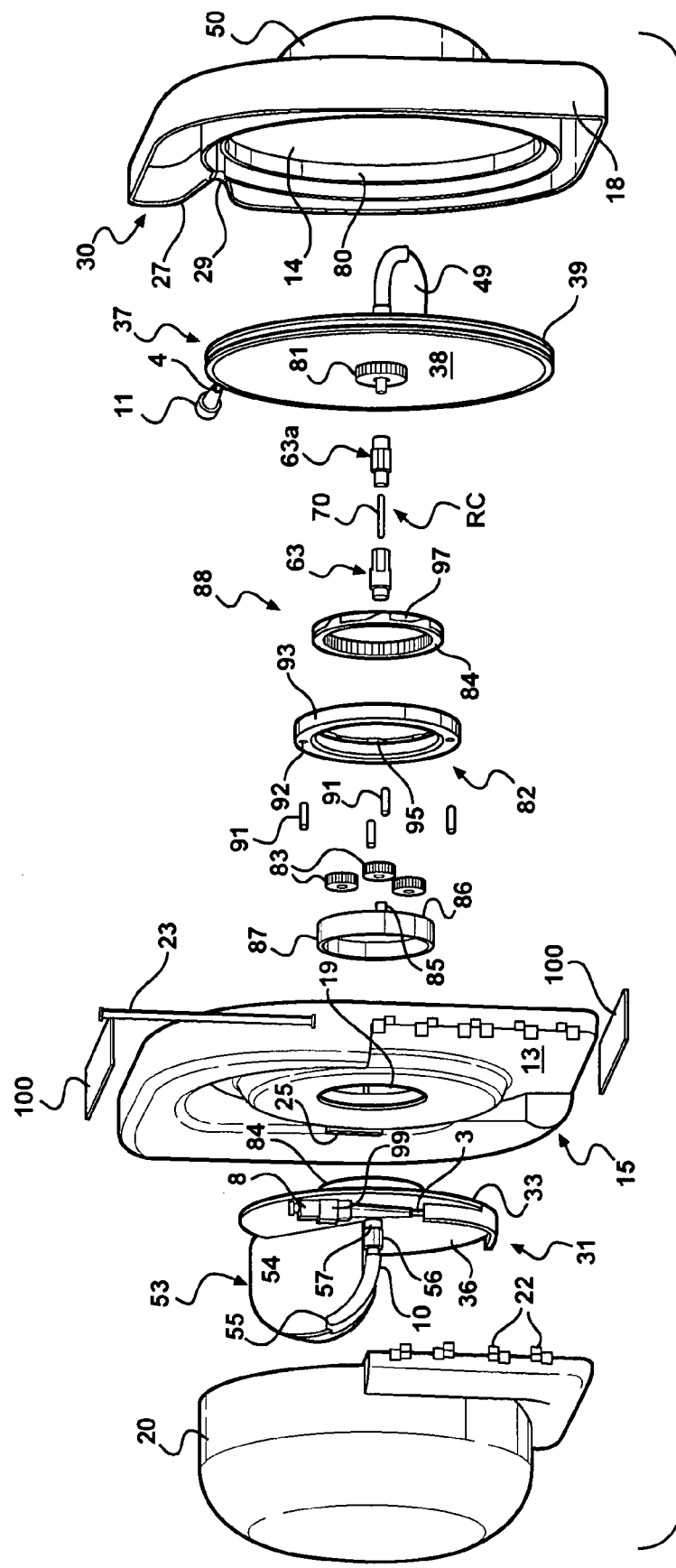
FIG. 8 is a view similar to FIG. 7, but showing the apparatus from another direction.

The casing 1 (as shown in FIGS. 7 and 8) has a front housing part 15 having a wall 13 and a rear housing part 16 which confront one another and support flanges 17 and 18, respectively. The front and rear housing parts ultimately are welded or otherwise suitably secured to one another to form the hollow casing 1.

The front housing part 15 has an opening 19 (FIG. 8) therein which can be closed by a cover 20 hingedly mounted on the front housing part 15 by hinge knuckles 21 and 22 carried by the front housing part 15 and the cover 20, respectively, and a hinge pin 23. The cover has a flexible latch 24 which is releasably engageable with and disengageable from a keeper slot 25 formed in the front housing part 15.

The front housing part 15 and the rear housing part 16 are provided with overlying, inwardly tapering, arcuate sections 26 and 27 and grooves 28 and 29, respectively, which form a bell-shaped receiver 30 (FIG. 2) in communication with the interior of the casing. The cable 4 thus may pass through the receiver 30 into and out of the casing. When the cable 4 is fully retracted into the casing the connector 11 occupies the receiver. The arcuate sections 26 and 27 are formed on radii which are no less than the minimum bending radius of the cable.

The apparatus includes a first spool 31 (FIG. 7) on and from which the cable 3 may be wound and unwound. The spool has a disk 32 the diameter of which is greater than that of the opening 19 so as to prevent passage of the spool through such opening. Secured to the disk 32 is a flange 33 having an annular groove 34 therein for the accommodation of the coiled cable 3. The spool 31 has a flat outer face 36 which extends beyond the outer surface of the wall 17 of the front housing 15 thereby providing clearance for the cable to be unwound from and rewound on the spool.

A second spool 37 has a cylindrical body 38 provided with an annular groove 39 for the accommodation of a portion of the cable 4. The spool 37 is best shown in FIGS. 4-8. The groove 39 has a base 40 in communication with a substantially chordal slot 41 which extends inwardly from the peripheral edge of one side of the spool body. The slot 41 communicates with an arcuate slit 42 adjacent the base 40 of the groove 39. The slot 41 also communicates with an arcuate, laterally extending slit 43 which enables the cable 4 to pass from the groove 39 to one side of the body 38 adjacent a hub 45 and into an arcuate passage 46 formed in a guide body 47 which is carried by and projects laterally of the spool body 38. The guide body 47 has spaced, parallel walls 49 which define the arcuate passage 46 of substantially 270° which guides the cable 4 through the guide body 47 along an arcuate path which leads to the hub 45 at the axis of rotation of the spool 37. Although the cable 4 turns or bends as it traverses the distance from the groove 39 to the hub 45, no part of the cable is subjected to a turn or bend having a radius less than the minimum bending radius. The passage 46 communicates with the hub 45 via a groove 51 and an opening 52. The groove extends along the outer surface of the guide body 47. See FIGS. 5 and 6.

The groove 34 in the spool 31 has a base and a slit corresponding to the base and slit described in connection with the spool 37. The spool 31 has a laterally projecting guide body 53 which also functions as a crank, as will be explained shortly. The body 53 has spaced side walls 54 which form a passage like the passage 46 in the guide body 53 and which is traversed by the cable 3. The cable 3 emerges from the passage through the guide body 53 at an opening 55 in communication with a trough-like channel for the accommodation of a portion of the boot 10 in which the cable 3 is accommodated. The inner end of the cable 3 is connected to the standard F C male connector 56 which is connected to the F C Female body half of the 360° rotatable coupler 63 at the axis of rotation of the spool 31. The cable 3 is not subjected to any turns or bends having a radius less than the minimum bending radius of the cable. The body or crank 53 is of such size as freely to be accommodated in the cover 20 when the latter is in its closed position.

The ends of the cable 3 and 4 are positioned at the axis of rotation of the two spools and in coaxial alignment by a female body half or rotor 63 and a male body half or rotor 63a which, when assembled, form the 360° rotatable coupler RC which is best illustrated in FIGS. 9-13. As is best shown in FIGS. 11 and 12, the male body half or rotor of the 360° rotatable coupler is connected to the standard F C male connector 56 of the kind manufactured by AMP Division of Tyco International, Ltd., among others. The cable 3 is connected to the standard F C male connector 56 including the strain relieving boot 10. Within the connector is a metallic sleeve 60 one end of which is received in a rotary socket 61. The socket is encircled by an externally threaded extension 62 which is part of the connector 56 and is connected to the female body half 63 of the 360° rotatable coupler RC which has a bore 64 and one or more flats 65 on the exterior. The female body half 63 of the 360° rotatable coupler RC has a plurality of circumferentially spaced, axially extending fingers 66, each of which has a lateral notch 67 adjacent its free end.

The F C male connector 56a is connected to the male body half 63a of the 360° rotatable coupler RC, and parts that are similar to the parts of the body half 63 are identified by the same reference characters followed by the suffix a.

At the free end of the male body half 63a of the 360° rotatable coupler RC is a tubular extension 68. At the free end of the extension 68 is an annular ridge 69 which reacts with the notches 67 in the fingers 66 the annular ridge 69. The notches 67 and the ridges 69, when the coupler is assembled, create a detent action which restricts axial movement while enabling full 360° rotation.

The 360° rotatable coupler RC includes a tubular bushing 70 which spans the male and female body parts 63, 63a of the 360° rotatable coupler and provides a journal therefor. The bushing 70 has an axially extending bore 71 in which two stainless steel ferrules 72 and 72a are accommodated. The ferrules have axial bores 73, 73a which are in alignment with one another and with the mating zirconia ferrules 3 and 4 which are fitted into and are part of the standard F C male connectors 56 and 56a, thereby enabling light energy from either of the cables to be transmitted to the other without interruption. Each ferrule 72, 72a has a part thereof extending outward of the bushing 70 and which is accommodated in a sleeve 74, 74a. As is best shown in FIGS. 9 and 11 the confronting ends of the ferrules 72 and 72a see FIG. 11 do not engage one another, but instead are axially spaced by a gap 75. The gap 75 avoids abrasion of the ferrule ends when either ferrule rotates relative to the other. Maintenance of the gap is ensured by the adhesive securing of the ferrules in the sleeves and by the detent action created by the annular ridge 69 and the notches 67 which prevent axial movement but allows full 360° rotation of the body parts 63 and 63a. The female body half 63 and the male body half 63a extend through the hubs of the spools 31 and 37, respectively, so as to provide a rotatable support for the spools as is diagrammatically indicated in exaggerated form by phantom lines in FIG. 10. The body halves 63 and 63a of the 360° rotatable coupler RC are glued to the center openings in spools 31 and 37.

The openings in the spools 31 and 37 through which the female and male body halves of the 360° rotatable coupler extend are complementary to the flats 65, 65a and provide a non-rotational mounting surface for the spools 31 and 37. The male and female body parts of the 360° rotatable coupler will be glued in the proper location in the respective spools during the assembly process.

The spool 37 is rotatably mounted within a flange 80 carried by the housing part 16 and which encircles the opening 14. That side of the spool 37 which extends through the opening 80 in the rear housing part 16 carries the hub 45 at the axis of rotation of the spool and through which the standard F C male connector 56a is connected to the female portion of the male body half 63a of the 360° rotatable coupler. On the opposite or inner side of the spool 37 is a gear 81 which encircles the axis of rotation and forms part of a gear transmission 82 which enables conjoint rotation of the spools 31 and 37.

The transmission 82 comprises three pinion gears 83 which encircle and mesh with the gear 81 and with a ring gear 84 which encircles the three pinion gears 83. The pinion gears are mounted on three spindles 85 carried by an annular cap 86 having a peripheral flange 87. The transmission 82 also includes a clutch 88 mounted within a flange 89 carried on the inner face of the front housing part 15. Fixed to the inner face of the housing wall 13 and inwardly of the flange 89 are four guide pins 90 which extend through four compression springs 91 into openings 92 formed in a clutch ring 93. The arrangement is such that the clutch ring 93 is coupled to the housing wall 13 by the guide pins 90 and yieldably biased by the springs 91 toward the spool 37. The springs enable the clutch ring 94 to be axially reciprocable toward and away from the spool 37.

The cap 86 overlies an annulus or flange 94 fixed on the face 32 of the spool 31 with the cap flange 87 encircling the annulus 94. The height of the flange 87 is less than that of the annulus 94 so that, when the cap 86 is assembled on the annulus 94, an annular groove will exist between the free end of the flange 87 and the face 32 of the spool 31. The purpose of this construction will be explained shortly.

The clutch ring 93 encircles the ring gear 84. The inner periphery of the clutch ring 93 has a plurality of circumferentially spaced, axially inclined teeth 95 which interfit with complementally spaced, inclined teeth 96 on the outer surface of the ring gear 84 so that, when the spool 31 rotates in the clockwise direction, as viewed in FIG. 7, the spool 37 will be rotated in the corresponding direction. However, when the spool 31 is rotated in the counterclockwise direction, as viewed in FIG. 7, the teeth 95 on the inner surface of the clutch ring 93 will react in a camming manner with the clutch teeth 96 on the outer surface of the ring gear 84 and disengage the ring gear 84 from the clutch ring 93 as is permitted by the four springs 91, thereby enabling relative rotation of the spools 31 and 37 in a counterclockwise direction.

To condition the apparatus for operation, the cable 3 may be wound on the spool 31 to assume the form shown in FIG. 1 and the connector 8 fitted into a U-shaped retainer 98 having spaced, springy fingers 99 for removably accommodating the connector 8. The free end of the cable 3, which is attached to the standard F C male connector 56 and to the assembled female body half or rotor of the 360° rotatable coupler RC, will be extended through the guide housing 53 and wrapped into the groove 34 in the spool 31. The connector 8 then may be securely fastened in the U-shaped retainer 98. Those parts of the transmission 88 which are carried by the spool 31 then may be assembled with the latter.

The free end of the cable 4 is connected to the standard F C male connector 56a and is connected to the assembled male body half of the 360° rotatable coupler RC. The cable preferably will have been extended through the guide housing 49 and wrapped into the groove 39 in the spool 37 prior to the securing of the connector end 11.

The assembly process includes the assembly of all sub assemblies. The front housing 15 and the cover 20 are assembled using the hinge pin 23, the first spool 31 is assembled with the front housing 15 by extending the annulus 94 through the opening 19. The cap 86 is fitted over the annulus 94 and glued thereto. Because the height of the flange 87 of the cap 86 is less than that of the annulus 94, as has been stated, a groove will be provided between the free edge of the flange 87 and the adjacent surface of the housing wall 13. The radius of the flange 87 is greater than that of the annulus 94. As a consequence, the free edge of the flange 87 will overlie the edge of the wall 13 so as to prevent axial movement of the annulus 94 to the left, as viewed in FIG. 7, out of the opening 19. Movement of the annulus 94 and the spool 31 to the right will be prevented by engagement of the spool disc 32 with the wall 13 of the front housing. The groove between the free edge of the cap flange 87 and the housing wall 13 provides clearance sufficient to enable rotation of the cap 86 conjointly with the spool 31.

The four springs 91 and the clutch ring 93 are assembled in the front housing 15, the three pinion gears 83 are mounted on the associated spindles 85, the ring gear 84 is assembled with the clutch ring 93, the floating bushing 70 is assembled on the ferrule 72 associated with the rotor or body half 63 of the 360° rotatable coupler RC, the second spool 37 is assembled with the ferrule 72a associated with the rotor body half 63a of the 360° rotatable coupler RC, followed by snapping the body halves 63, 63a together. At this time the gear 81 on the spool 37 is in mesh with the pinion gears 83 and the rear housing flange 18 is placed in position in engagement with the front housing flange 17. The connector 11 may be placed in the receiver 30. The cover 20 then may be swung about the hinge to the closed position and latched in such position. The front and rear housing halves then may be welded or otherwise secured to one another with both cables 3 and 4 in wound condition about the respective spools 31 and 37. In these positions of the parts the cables and their respective connectors are in protected condition.

To extend the cable 3 from the casing the door 20 is opened, the connector 8 removed from the retainer 98, and the cable 3 pulled in a direction to unwind a selected length thereof from the spool 31.

Following the extension of a selected length of the cable 3 from the casing, the connector 11 at the outer end of the cable 4 may be pulled from the receiver 30 and rotate the spool 37 in a direction to enable a desired length of the cable 4 to be unwound from the spool 37. This will effect rotation of the spool 37, but the clutch will enable the spool 37 to rotate relative to the spool 31. When a selected length of the cable 4 has been extended from the casing, the connectors 8 and 11 of the test set may be connected to the parts of the optical circuit that is to be tested or checked.

A significant feature of the apparatus is that a user may select either cable 3 or 4 and the associated connector to perform a specific task. Either cable may be extended from the casing the exact distance to be spanned. As a consequence the problems created by excessive slack or excess coils normally associated with standard jumper cable test sets are simply avoided.

When the function to be performed by the apparatus has been completed, the connectors 8 and 11 may be disconnected from those parts of the circuit to which they were connected and the spool 31 manually rotated via the guide body or crank handle 53 in a direction to wind the cable 3 on the spool 31. Rotation of the spool 31 will effect, via the transmission 82, corresponding rotation of the spool 37 so as to rewind the cable 4 on the spool 37. The 3:1 ratio of the gear transmission allows rotation of the spool 37 to rotate at a rate greater than that of the spool 31. As shown in the drawings the spool 37 may rotate at a greater rate. The gear ratio between the spool 31 and the spool 37 is 3:1. When the cable 3 has been fully rewound, the connector 8 may be returned to the retainer 98.

Rotation of the spool 31 by the crank (after return of the connector 8 to the retainer 98) may continue until such time as the connector 11 on the cable 4 is returned to the receiver 30. Even though the cable 3 may be fully rewound on the spool 31 before the cable 4 is fully rewound on the spool 37, the accommodation of the connector 8 in the retainer 98 enables the two spools to rotate conjointly and without affecting the cable 3. The axial gap 75 between the confronting ends of the ferrules 72 and 72a within the 360° rotatable coupler RC, along with the ability of the cables 3 and 4 to rotate with their respective spools and independently of one another, avoids any adverse effects on the cables due to twisting, kinking, or abrading of the opposing ferrules which could occur if the confronting ends of the ferrules made contact with each other. Further, the guiding of the respective cables along paths which avoid turning or bending of the cables at a radius less than the minimum bending radius avoids any kinking of the cables in unwinding and rewinding them in their extension and retraction relative to the casing.

In some instances it may be desirable to provide temporary support for the casing in a stable position during use. This may be accomplished by adhering magnetic strips 100 to the flat sides of the casing. This will enable the casing to be removably supported on a junction box or other structure which is magnetically permeable.

The disclosed embodiment is representative of a presently preferred form of the invention, but is intended to be illustrative rather than definitive thereof. The invention is defined in the claims.

We claim:

1. Apparatus for storing, winding, and unwinding a pair of sheathed optic fibers each of which has a longitudinal axis and a minimum bending radius, said apparatus comprising a casing defining a hollow housing having front and rear members; a first spool having a groove in which a selected length of one of said sheathed fibers may be wound; a second spool having a groove in which a selected length of a second of said sheathed fibers may be wound, each of said sheathed fibers being independent of the other; means journaling said spools in side-by-side relation within said housing for rotation about a common axis of rotation; guide means carried by said spools for guiding each of said sheathed fibers from the associated spool to said axis of rotation and positioning an end of each of said sheathed fibers in confronting relation to an end of the other of said sheathed fibers; and coupling means at said axis of rotation for coupling said sheathed fibers end-to-end with the respective longitudinal axes of said fibers in axial alignment.

2. The apparatus according to claim 1 wherein said confronting ends of said fibers are axially spaced apart.

3. The apparatus according to claim 1 wherein the guide means associated with one of said sheathed fibers comprises a first projection extending laterally from one of said spools and forming an arcuate path in communication at one end with the groove in said one of said spools and at another end with said axis of rotation.

4. The apparatus according to claim 1 wherein the guide means associated with the other of said sheathed fibers comprises a second projection extending laterally from the other of said spools and forming an arcuate path in communication with one end of the groove in said other of said spools and at another end with said axis of rotation.

5. The apparatus according to claim 1 wherein said journaling means comprises a pair of rotors carried by said coupling means, one of said spools being fixed to one of said rotors and the other of said spools being fixed to the other of said rotors.

6. The apparatus according to claim 5 wherein said journaling means comprises a tubular bushing coaxial with said ends of said fibers and supporting said ends of said fibers in axial alignment, said rotors being journaled by said bushing.

7. The apparatus according to claim 1 including clutch means interconnecting said spools for selectively enabling and disabling conjoint rotation of said spools.

8. The apparatus according to claim 1 wherein said casing has a first sheathed fiber passage in communication with said housing and through which one of said sheathed fibers may pass into and out of said housing, said casing having an opening through which the other of said sheathed fibers may pass into and out of said housing.

9. The apparatus according to claim 8 wherein said first passage has an arcuate surface engageable with said one of said sheathed fibers, said arcuate surface having a radius no less than said minimum bending radius.

10. Apparatus for storing and independently extending and retracting a pair of sheathed optical fibers wound on separate spools, each of said sheathed fibers having a longitudinal axis, a free end, and a minimum bending radius, said apparatus comprising a housing; means mounting said spools in said housing for rotation about a common axis of rotation; and coupling means coupling the free ends of said first and second sheathed fibers in confronting, spaced apart relation at said axis of rotation and for rotation with the respective spools about said axis of rotation, said sheathed fibers having opposite ends, said housing having openings through which the opposite ends of said sheathed fibers may be extended to enable said sheathed fibers to be unwound from their respective spools, the unwinding of said sheathed fibers from their respective spools effecting rotation of the respective spools.

11. The apparatus according to claim 10 including guide means for guiding said sheathed fibers along passages leading from the respective spools to said axis of rotation, said passages having no turns or bends formed on a radius less than said minimum bending radius.

12. The apparatus according to claim 10 including clutch means interposed between said spools for selectively enabling and disabling conjoint rotation of said spools.

13. The apparatus according to claim 10 including a crank carried by one of said spools for rotating the latter in a selected one of two opposite directions.

14. The apparatus according to claim 10 including a 3:1 gear ratio transmission means coupling said spools and operable to transmit rotation of said one of said spools to said other of said spools.

15. The apparatus according to claim 14 wherein said gear transmission effects rotation of said other of said spools at a rate greater than that of said one of said spools.

16. A 360° rotatable coupler for mounting a pair of spools for selectively conjoint and independent rotation about a common axis, said 360° rotatable coupler comprising a tubular bushing having a bore; first and second coaxial tubular ferrules rotatably accommodated in said bore and projecting beyond opposite ends thereof; and first and second coaxial sleeves each having a bore therein and abutting that end of said bushing from which the respective ferrules project, said sleeves accommodating in the respective bores thereof the projecting ends of said ferrules, said first and second ferrules having confronting ends within said bushing spaced from one another by an axial gap.

17. The 360° rotatable coupler according to claim 16 including first and second rotors within which the respective first and second sleeves are accommodated.

18. The 360° rotatable coupler according to claim 17 including coupling means joining said first and second rotors for relative rotation thereof.

19. The 360° rotatable coupler according to claim 18 wherein said coupling means comprises an extension having an annular ridge on one of said rotors extending toward the other of said rotors and springy fingers including notches extending from said other of said rotors and rotatably connecting said rotors to one another forming a detent action.

20. The 360° rotatable coupler according to claim 19 wherein said coupler has a male body half and a female body half, wherein said extension has a free end having an annular ridge, and wherein said springy fingers have notches, part of the female body half of the 360° rotatable coupler being engageable with and disengageable from said ridge and notches to enable said body halves to be coupled to and uncoupled from one another.

21. The 360° rotatable coupler according to claim 20 wherein said extension including the annular ridge and said springy fingers including the notches when engaged are relatively rotatable.

22. A 360° rotatable coupler for rotatably coupling a pair of fiber optic cables in such position as to enable light energy from one of said cables to be transmitted to the other of said cables, said 360° rotatable coupler comprising first and second fiber optic cables each of which has at its core an axial light transmitting fiber having a minimum bending radius; a pair of tubular sleeves one of which accommodates a free end of one of said cables and the other of which accommodates a free end of the other of said cables; a pair of ferrules each of which has an axial light transmitting bore, one of said ferrules being accommodated in one of said sleeves and the other of said ferrules being accommodated in the other of said sleeves, the bores of said ferrules being coaxial with the cores of said cables; a bushing having a bore in which said ferrules are rotatably accommodated with the bores thereof coaxial; and a pair of rotors accommodating the respective sleeves and being mounted by said bushing for rotation relative to one another.

23. The 360° rotatable coupler according to claim 22 wherein said sleeves are fixed to the respective ferrules and wherein said ferrules extend into the bore of said bushing toward one another but terminate short of engagement with one another.

24. The 360° rotatable coupler according to claim 16 wherein the bore of each of said ferrules is coaxial with said common axis.

25. The 360° rotatable coupler according to claim 22 wherein the sleeves and bores in which said cables are accommodated have no bends or turns formed on a radius less than said minimum bending radius.

* * * * *